Jan. 3, 1933.                    A. F. VINJE                    1,892,915
AIRCRAFT CONTROL SURFACE ADJUSTING MECHANISMS
Filed March 19, 1930
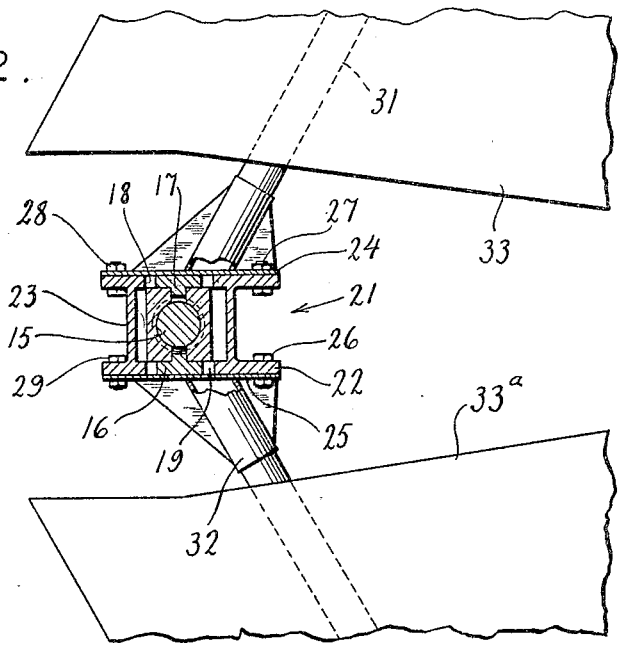
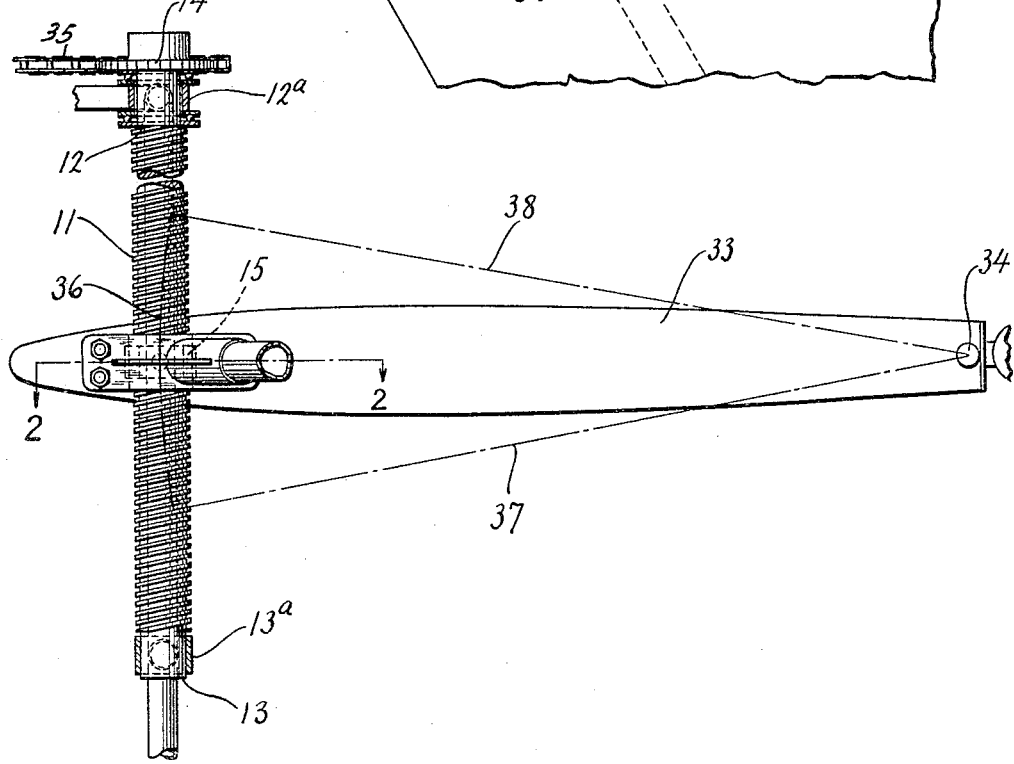
INVENTOR
ARNE F. VINJE
BY
ATTORNEY Patented Jan. 3, 1933

1,892,915

UNITED STATES PATENT OFFICE

ARNE F. VINJE, OF FREEPORT, NEW YORK, ASSIGNOR TO CURTISS AEROPLANE & MOTOR COMPANY, INC., A CORPORATION OF NEW YORK

AIRCRAFT CONTROL SURFACE ADJUSTING MECHANISMS

Application filed March 19, 1930. Serial No. 436,966.

This invention relates to mechanism for adjusting aircraft control surfaces and is especially fitted for use in adjusting the position of the horizontal stabilizers of aircraft, though it clearly should not be limited to such specific use.

Prior to this invention means have been provided for adjusting the horizontal stabilizers of airplanes. These adjusting means have sometimes been capable of being operated from the cockpit of the airplane. For instance, there have been previously proposed, screws capable of raising or lowering stabilizers. In all such cases, however, due to the fact that the stabilizer moves in an arc about a pivot, unless some compensation is provided, there is some play in the bearings for the screw or else the screw has to be able to bend. It has therefore been considered necessary to compensate for the arc by inserting a link in the connection with the stabilizer, or providing a pivot for the screw. Such apparatus may operate fairly satisfactorily where only a small amount of adjustment of the stabilizer is desired. However, when it is desired to be able to adjust the stabilizer through large angles, it is necessary that a more improved apparatus be provided.

One of the objects of my invention is the provision of apparatus for adjusting a control surface of aircraft which will be capable of accurately effecting large adjustments.

A further object is the elimination of excessive play and bending in the adjusting screws used for the adjustment of aircraft control surfaces.

A further object is the attainment of more exact adjustment of said control surfaces.

A further object of my invention is to provide a screw capable of effecting stabilizer adjustment arranged in such a way that the lift of the stabilizer is applied to the adjusting screw at a point intermediate the supports and through the neutral axis of said screw so as not to subject the screw to excessive bending moments.

Further objects will be apparent from a reading of the subjoined specification and claims and from a consideration of the accompanying drawing.

In order to explain the invention more clearly, one embodiment thereof is shown in said drawing, in which:

Fig. 1 is an elevation of part of an adjusting apparatus used for the purpose of setting the horizontal stabilizer of an airplane; and Fig. 2 is a horizontal section taken substantially on the line 2—2 of Fig. 1, but showing parts of the stabilizer in full lines.

In general, the apparatus used for illustration of my invention comprises a substantially vertical screw capable of being rotated by a sprocket chain which is connected to a hand crank in the cockpit of the airplane. Mounted on this screw is a nut secured to a part of the horizontal stabilizer, the point of connection being located at some distance from the pivot of said stabilizer. Thus, movement of the sprocket chain by an operator in the cockpit causes rotation of the screw and vertical movement of the nut which in turn raises or lowers the adjacent end of the stabilizer to cause it to assume a different angle of incidence.

Referring more specifically to the drawing, I have shown a substantially vertical screw 11 provided with collars 12 and 13 to be carried in bearings 12$^a$ and 13$^a$. The screw is provided with a sprocket wheel 14 located adjacent to the upper end thereof just above the collar 12. The screw 11 is arranged to be threaded through a block or nut 15, which is pivotally carried by sliding trunnions 16 and 17. The trunnions 16 and 17 are arranged to slide longitudinally of the airplane in grooves 18 and 19 formed as a horizontal slideway for the said trunnions. The grooves 18 and 19 are formed in a fitting 21 composed of channel elements 22 and 23, and plates 24 and 25 fastened to the channel elements by bolts and nuts 26, 27, 28 and 29. The plates 24 and 25 may be secured to or formed integral with stabilizer brackets or braces 31 and 32 which are connected to a stabilizer or horizontal control surface 33—33ᵃ pivoted at 34. A sprocket chain 35 may be carried around the sprocket wheel 14 and lead to the cockpit of the airplane in order that the screw may be rotated and the stabilizer adjusted therefrom.

It is thought that the operation of the above described apparatus will be apparent. The pilot desiring to raise or lower the stabilizer 33 may turn a lever or crank to move the chain 35 and thus rotate the sprocket wheel 14 and the screw 11. The nut block 15 is secured against rotation by its engagement with the fitting 21 and therefore the rotation of the screw causes a vertical movement of the said nut block 15 and fitting 21 relative to the screw 11. Inasmuch as the screw 11 is maintained against vertical movement by ball bearings which are provided on each side of the collar 12 in the bearing 12ᵃ, the block 15 and the fitting 21 are necessarily raised or lowered and with them the end of the horizontal stabilizer opposite to the pivot 34. The vertical movement of the fitting 21 may cause a movement of the end of the stabilizer along the arc 36 from a position indicated by the dot and dash line 37 to the position indicated by the dot and dash line 38. The trunnions 16 and 17 may slide in the grooves 18 and 19, and thus provide for the lateral component of the movement of the nut 15 without a corresponding movement of the screw 11.

It may be seen that the nut 15 supporting the stabilizer 33 is positioned intermediate the bearings 12ᵃ and 13ᵃ so that cantilever action on the screw 11 is eliminated.

It is to be understood that the above described embodiment of the invention is for the purpose of illustration only and various changes may be made therein without departing from the spirit and scope of the invention.

I claim as my invention:

1. In an airplane, a substantially horizontal control surface, a pivot for said control surface arranged adjacent to the trailing edge thereof, a pair of diagonally arranged braces attached to said control surface, a pair of plates secured to said braces, a pair of channel members interposed between and secured to said plates so that said channel members and said plates form a pair of grooves, a pair of trunnions mounted for sliding movement in said grooves, a nut block mounted on said trunnions, a substantially vertical screw threaded through said nut block, a pair of bearings in which the ends of said screw are mounted, and means for rotating said screw comprising a sprocket wheel and a sprocket chain.

2. In an airplane, a pivotally mounted control surface, a pair of braces attached to said control surface, a pair of plates secured to said braces, a pair of channel members interposed between and secured to said plates so that said channel members and said plates form a pair of grooves, a pair of trunnions mounted for sliding movement in said grooves, a nut block mounted on said trunnions, and a screw threaded through said nut block.

In testimony whereof I hereunto affix my signature.

ARNE F. VINJE.